June 6, 1944.  J. L. SPEERT  2,350,374
DEVICE FOR LOCATING CELESTIAL BODIES
Filed July 1, 1943  3 Sheets-Sheet 1

Inventor
Julius L. Speert
By J. T. Mothershead
Attorney

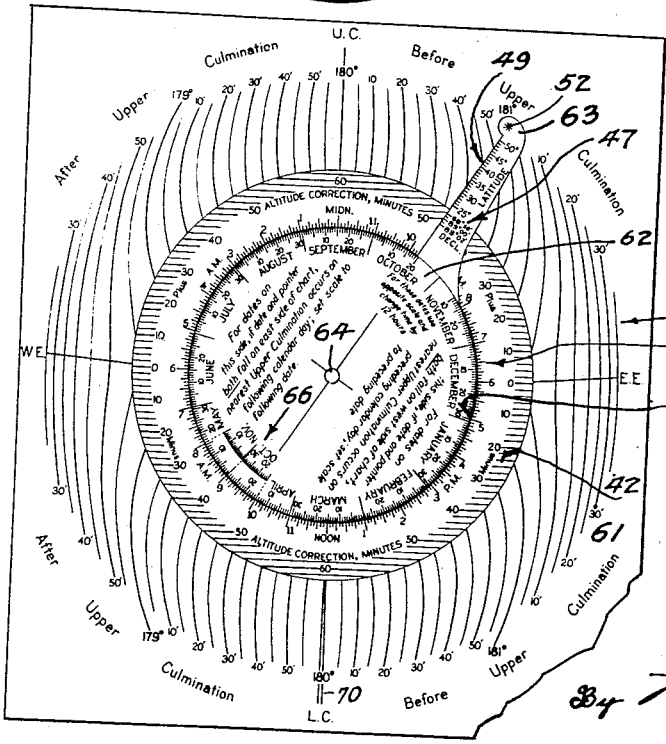

June 6, 1944. J. L. SPEERT 2,350,374
DEVICE FOR LOCATING CELESTIAL BODIES
Filed July 1, 1943 3 Sheets-Sheet 3

Inventor
Julius L. Speert
By J. T. Mothershead
Attorney

Patented June 6, 1944

2,350,374

UNITED STATES PATENT OFFICE 2,350,374

DEVICE FOR LOCATING CELESTIAL BODIES

Julius L. Speert, Washington, D. C.

Application July 1, 1943, Serial No. 493,030

6 Claims. (Cl. 35—44)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a device for locating a celestial body and is for use by surveyors, navigators and others in determining the direction and position of a selected celestial body or in determining the direction of true north by reference to a selected celestial body.

The invention has particular application for locating the North Star, also known as Polaris, and will, therefore, be described in such application for purposes of illustration. The adaptation of this invention to other specific stars, however, will be readily apparent from an understanding of this disclosure.

One of the basic problems of surveyors and navigators is the location of true north for the purpose of determining direction. Because of irregular variations in the earth's magnetism, and other weaknesses, the magnetic compass is not suitable for accurate determination, and resort must be made to astronomic observations. The star most frequently used for determining azimuth or direction in the northern hemisphere is α Ursae Minoris, popularly known as Polaris, and sometimes called the Pole Star, the North Star, or the Lode Star. This star is easily identified at night from its relationship with other stars in nearby constellations. It appears to rotate counter-clockwise about the North Pole in a circular path of relatively small diameter, making one complete passage in a sidereal day (23 hr. 56 min. 04.254 sec. of mean solar time). Although its maximum departure from true north will not exceed 3° for any point south of the Arctic Circle, its true direction from any given point is constantly changing and must be determined for the instant of each particular observation. The device of this invention facilitates that determination.

Although most star observations are ordinarily made at night, night observing has many obvious disadvantages, particularly in connection with work that is normally done in daylight, such as surveying; and such work can be materially speeded if the star observations can be made during the day. Although Polaris is not visible to the naked eye during daylight, it can be seen and observed on through a surveyor's telescope in the daytime, if the weather is clear, and if the telescope can be pointed toward the star with sufficient accuracy to bring the star into the field of view. For this purpose, it is usually necessary to know in advance the time at which the observation is to be made so that the direction of the star may be predetermined. The device of this invention facilitates the predetermination of the direction of Polaris at the time of the observation so that it may be found with the telescope during daylight.

Azimuth may be defined as the direction of a line or object from a given point, measured clockwise, usually from the south. The azimuth angle of a star is the angle that its azimuth line makes with the meridian, and may be measured in either direction from the meridian. All standard textbooks on practical astronomy give formulas by which the azimuth angle of a star at any time may be computed as a function of the latitude and longitude of the point of observation, the time of the observation, and the astronomical coordinates of the star, its right ascension and declination. The solution of the formulas is cumbersome and requires the use of trigonometric tables and tables of the star coordinates such as are contained in the American Ephemeris and Nautical Almanac. To avoid the need of solving the formula for each observation on Polaris tables of the "Azimuth of Polaris at All Hour Angles" are published in the Ephemeris as a function of the latitude and the sidereal hour angle of the observation. These tables are arranged for each 2° of latitude (within the limits of the United States) and for each 10 minutes of hour angle. Their use requires double interpolation, for latitude and for time, and also a computation of the sidereal hour angle, which is based on the time and longitude of the observation and the right ascensions of Polaris and the mean sun. Values derived from the azimuth tables require further correction for the declination of Polaris. By the use of the device of this invention, the true azimuth of Polaris at any time may be determined without the need of any computations or tables (except as noted later) by a single setting of the dial of the device.

The altitude of a star is its angular height above the horizon. At any point on the earth's surface the altitude of Polaris is equal to the latitude of the place plus or minus a correction derived from the declination and hour angle of the star. The device of this invention gives that correction at the same setting that gives the azimuth. It may be used also for determining the latitude of a station by an altitude observation on Polaris.

It is therefore an object of this invention to provide a relatively simple device for facilitating a determination of direction by reference to a celestial body.

Another object is to provide a relatively simple device for facilitating the predetermination by a surveyor or navigator of the position of Polaris or other celestial body at the time of observation so that such body may be found readily with the telescope during daylight.

A further object is to provide a relatively simple device, by which the true azimuth of a celestial body, such as Polaris, may be determined quickly and without the need of cumbersome and time consuming computations.

A still further object is to provide a relatively simple device which in one setting gives both the azimuth of a star and a correction for determining its altitude.

Still another object is to provide a relatively simple and inexpensive device of the character described for field use.

A further object is to provide a device of the character described which, although relatively simple, has adjustments that enable highly precise azimuth determinations and adapt the device to requirements of careful office calculations.

Other objects and advantages of this invention will be apparent from the following description, the appended claims, and the accompanying drawings, wherein:

Fig. 2 is a cross-sectional view taken on line 2—2 of Fig. 1.

Figs. 3 and 4 are top plan views of the arm and disc, respectively, of the device of Fig. 1.

Figs. 5, 6 and 7 are three views on enlarged scale of a detail of the device of Figs. 1 and 2, Fig. 5 being a top plan view, Fig. 6 a side elevational view, and Fig. 7 a cross-sectional assembly view.

Fig. 8 is an enlarged elevational view of the thumb nut of Figs. 1 and 2.

Fig. 9 is a plan view of a further embodiment of this invention.

Figure 1:
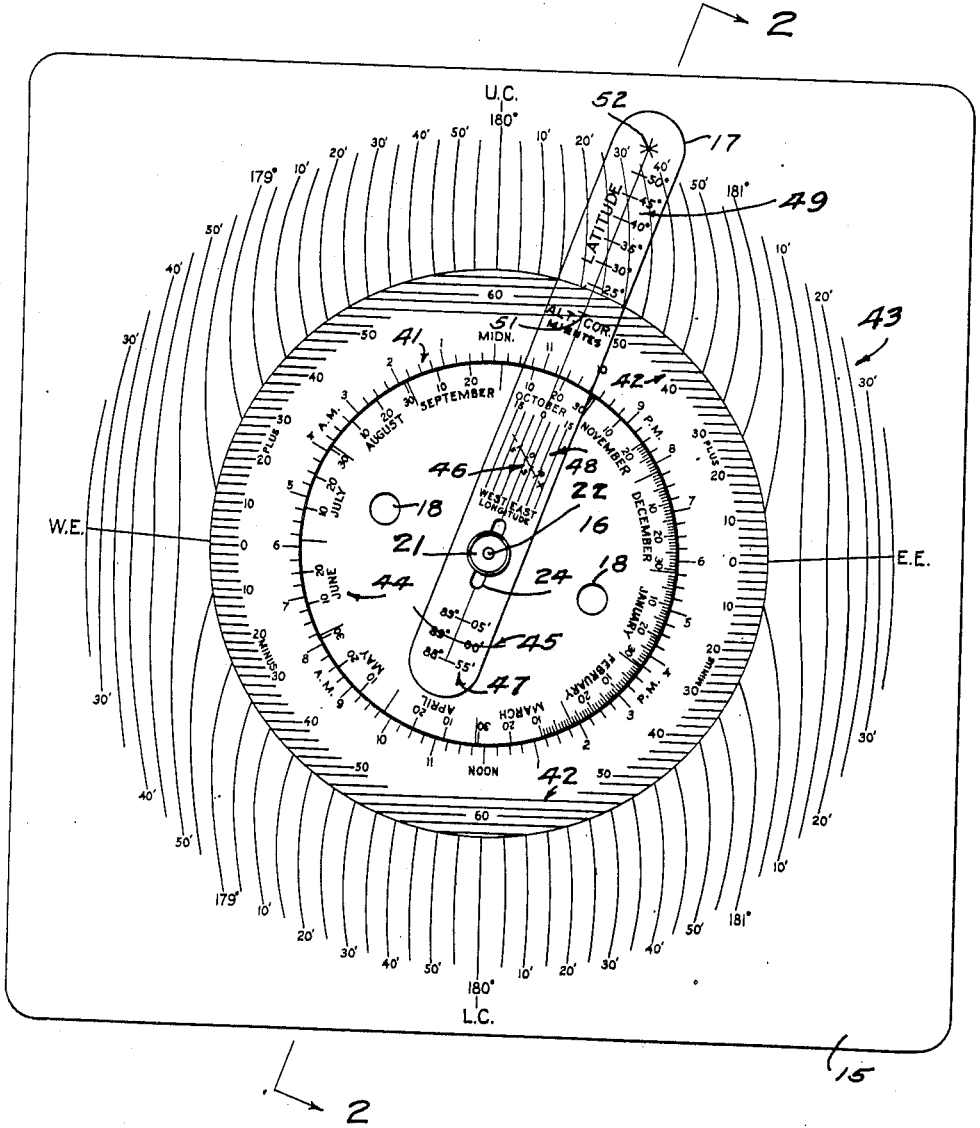
Fig. 1 is a top plan view of a device embodying the present invention.

Referring now to the drawings and the embodiment of Figs. 1 through 8, inclusive, the device comprises a base 15, a disc 16, an arm 17, and means (see particularly Figs. 6 and 8) for retaining these parts 15, 16 and 17 in assembled and adjustable relation. It is recommended that the several parts of the device be made of durable material, which is reasonably rigid and resistant to warping. The disc 16 may be made to fit into a circular recess in the base 15 (see Fig. 2) so that the upper surfaces of the disc 16 and the base 15 shall be flush (in the same plane). The disc 16 may be provided with one or more finger holes 18, or other means, to facilitate its turning by the user. The arm 17 is of transparent material. The base 15 and the disc 16 may be of material which is opaque, translucent, or transparent, as desired.

The base 15, the disc 16, and the arm 17 are retained in assembled relation by means of a thumb nut 21 threaded onto a threaded post 22, as shown in Fig. 2. The post 22 extends through the hole 23 of the disc 16 and through a radial slot 24 of the arm 17. A non-rotatable relation between the post 22 and the disc 16 is provided by forming the disc hole 23 of square or other non-circular shape and by having the engaged post section 26 of corresponding shape and size. Just below the section 26, the post 22 is provided with a flange 27 (Figs. 6 and 7), on which rests the marginal disc portion surrounding the opening 23. Thus when the parts are assembled, as in Fig. 7, the disc 16 is non-rotatably mounted on the post 22, and the arm 17, by reason of its slot 24 and the round shape of the corresponding post section 28, is both axially (or radially) and rotatably adjustable relative to the post 22. The disc 16 and the arm 17 are clamped to the post 22 by means of the thumb nut 21, the arm thereby being retained in a selected position of axial and rotatable adjustment relative to the disc 16. The depth of the post section 26 is slightly less than the thickness of the disc 16, whereby the arm 17 will lie flat on the disc 16 in the assembled and adjusted position. The interfitting relation of section 26 of the post 22 and the disc 16 prevent their relative turning while the nut 21 is being tightened. When the nut 21 is tightened, the arm 17 and the disc 16 are held together by the force of friction and the tension of the post 22 and are clamped between the nut 21 and the post flange 27.

The lower end of the post 22 is rotatably mounted in the base 15. This mounting may be accomplished by means of a circular bearing 29 into which the base of the post 22 is pressed (see Fig. 7). The bearing 29 is retained between the post flange 27 and a washer 31 which is secured to the post base by a screw 30. The bearing 29 also has a pressed fit within a hole in the base 15, as shown in Fig. 7. This bearing 29 facilitates free turning of the post 22, the washer 31, the disc 16, the arm 17, and the nut 21 as a unit relative to the base 15. The base 15 has a flange 32 which acts as a stop for the bearing 29 as it is pressed into place. This flange 32 is preferably of slightly less depth than the post flange 27 to prevent the disc 16 and the base 15 being clamped in non-rotatable relation when the nut 21 is tightened.

The device is provided with the following scales, charts, and reference marks or lines. The base 15 has one circular scale and two annular charts at different radial distances from the axis of the post 22 or the axis of rotation of the disc 16. The innermost of these is the scale 41 which is graduated as a clock into the twenty-four hours of the day and smaller subdivisions thereof. The scale 41 is illustrated as progressing in a counterclockwise direction. Next is the annular chart 2 which provides corrections, in minutes of arc, to be applied to the latitude of the observation station for determining the altitude of Polaris. The outermost chart 43 is an annular series or arrangement of curves of the azimuth of Polaris which may be developed from conventional azimuth formulas.

The disc 16 is provided about its circumference with a clockwise progressive date scale 44. This date scale 44 is graduated as a calendar for one year as illustrated in Figs. 1 and 4, so that by rotating the disc 16 the date of observation may be set opposite the time of observation of the scale 41. The disc 16 is also provided with index lines 45 and 46 for use in adjusting the arm 17, index line 45 being arcuate and index line 46 being straight, inclined and graduated as shown more clearly in Fig. 4. Line 46 is inclined at any convenient angle and is so graduated that one unit of graduation subtends an angle at center of the pivot 22 equal to the angle subtended by one day on the calendar scale 44.

The transparent arm 17 is provided with three scales 47, 48 and 49. The scale 47 (Figs. 1 and 3) is a scale of declination for Polaris and comprises a graduated section of the longitudinal center line of the arm 17 and is positioned to overlie the curved index line 45. The axial slot 24 permits axial or radial movement of the arm 17 to adjust its declination scale 47 relative to the curved index line 45 until the proper value of the declination scale 47 for a particular observation is over the index line 45.

The scale 48 is used in adjusting the arm 17 rotatively relative to the disc 16 to allow for variations in longitude, date, and time and for conversion from solar to sidereal time units. The scale 48 is positioned to overlie the graduated, inclined line 46 and comprises parallel lines graduated in degrees of longitude for the width of a standard time zone from the standard time meridian of the zone. The line 46 is inclined for greater accuracy in use of the scale 48 and is graduated for various settings of the scale 48 relative thereto. A table of settings is given below. The first two sections of this table give the settings on line 46 to allow for the relative daily variations in positions between Polaris and the mean sun and to convert mean time to sidereal time units; the last two sections allow for the progressive relative yearly motion.

16. The arm 17 is adjusted axially or radially so that the proper declination of Polaris, as shown by the Ephemeris, of the scale 47 registers with (overlies) the index line 45. The arm 17 is also adjusted rotatably about the post 22 so that the longitude difference between the point of observation and the standard meridian of the time zone agrees with the proper index setting, that is, the arm scale 48 is adjusted to a certain setting relative to the index line 46. This setting is determined by the longitude of the observation station and use of the table hereinbefore set out and in the manner above described.

The arm 17 having been adjusted into proper position relative to the disc 16, they (16 and 17) are clamped in such position by tightening of the

*Index settings for time zone, time, and year*

| Time zone | | Watch time | | Date | | | |
|---|---|---|---|---|---|---|---|
| Time meridian | Setting | Time | Setting | Year | Setting | Leap year | Interval |
| | | | | | | Year | Setting |
| W. long.=−<br>E. long.=+ | | | | 1940<br>44 | −.53<br>.00 | | + |
| 00° | .00 | Midn. | .00 | 48 | +.53 | 0 | .00 |
| 15 | .04 | 2 a. m. | .08 | 52 | 1.06 | 1 | .38 |
| 30 | .08 | 4 a. m. | .17 | 56 | 1.59 | 2 | .77 |
| 45 | .12 | 6 a. m. | .25 | 60 | 2.13 | 3 | 1.15 |
| 60 | .17 | 8 a. m. | .33 | 64 | 2.66 | 4 | .153 |
| 75 | .21 | 10 a. m. | .42 | 68 | 3.19 | | |
| 90 | .25 | Noon | .50 | 72 | 3.72 | NOTE: For January and February of leap year, use 1.53 with previous leap year date; for Feb. 29, use 0 with current date and date mark of Feb. 28; for remainder of year, use 0 and current date setting. | |
| 105 | .29 | 2 p. m. | .58 | 76 | 4.25 | | |
| 120 | .33 | 4 p. m. | .67 | 80 | 4.78 | | |
| 135 | .37 | 6 p. m. | .75 | 84 | 5.32 | | |
| 150 | .42 | 8 p. m. | .83 | 88 | 5.85 | | |
| 175 | .46 | 10 p. m. | .92 | 92 | 6.38 | | |
| 180 | .50 | Midn. | 1.00 | 1996 | +6.91 | | |

This table is given by way of example, it being understood that the list of years may be extended indefinitely to allow for the relative annual changes in position between the mean sun and Polaris. The table is used in the following manner for determining the setting of the arm scale 48 relative to the index line 46. Ascertain the date of the last preceding leap year, and the number of elapsed years since leap year; determine the standard time meridian of the watch, and the approximate watch time of the observation. Read the setting corresponding to each of these values, and obtain their sum. In usual practice, the watch time will be the only value that does not remain constant for a long time in any area. Rotate the arm 17 on the disc 16 until the setting on the inclined index line 46 so determined coincides with a reading on the scale 48 corresponding to the longitude difference of the observation station from the standard time meridian.

The scale 49 of the arm 17 is graduated into degrees of latitude for the observation and overlies the azimuth chart 43 of the base 15.

The arm 17 is also provided with an index line 51 and a symbol 52. The index line 51 overlies the altitude correction chart 42 of the base 15. The symbol 52 is a representation of the celestial body on which a determination is being made and enables the user of the present device to visualize the celestial body movement and position.

*Use and operation of embodiment of Figures 1 through 8*

The initial step in using the device of Figs. 1 through 8 is to set the arm 17 relative to the disc thumb screw 21. The disc 16 and arm 17 are turned as a unit until the date of observation on the scale 44 registers with the standard time of the observation on the scale 41. The azimuth of Polaris is now determined by reference to the position of the latitude of observation of the scale 49 on the azimuth chart 43. The altitude correction is now determined by reference to the position of the altitude index line 51 on the chart 42.

For the purpose of illustrating a specific use of this device, reference may be made to Fig. 1, which shows the setting for the following assumed observations: The place, date and time of observation are, respectively, latitude 36° N., longitude 90°30′ W., November 28, 1943, 7:58 p. m., C. S. T. (90th meridian W. longitude). From the Ephemeris it is found that the declination of Polaris on November 28, 1943, is 89°00′. (This value changes only slightly during a period of several months.) From the table set out above, the following values are obtained:

```
1940 _____  −.53
3 yr _____  +1.15
8 p. m _____  −.83
90th mer. W _____  −.25
                                     _____
    Sum _____  −.46
```

Adjust the arm 17 radially to position the reading 89°00′ of the declination scale 47 over the index line 45. Adjust the arm 17 rotatively to position the reading 30′ (=½°) W. of the scale 48 over the reading −.46 of the index line 46. Then tighten the thumb nut 21. Next, turn the disc 16 until the date November 28 of the scale 44 coincides with the time 7:58 p. m. of the scale 41. The device is now set and adjusted as illustrated in Fig. 1. At 36° on the latitude scale 49, read the azimuth of Polaris on the chart 43 as 180°26.3′. At the altitude index line or mark 51 on the arm 17, read the altitude correction on the chart 42 as +56′. The correct altitude is, therefore 36°56′.

Figure 10:
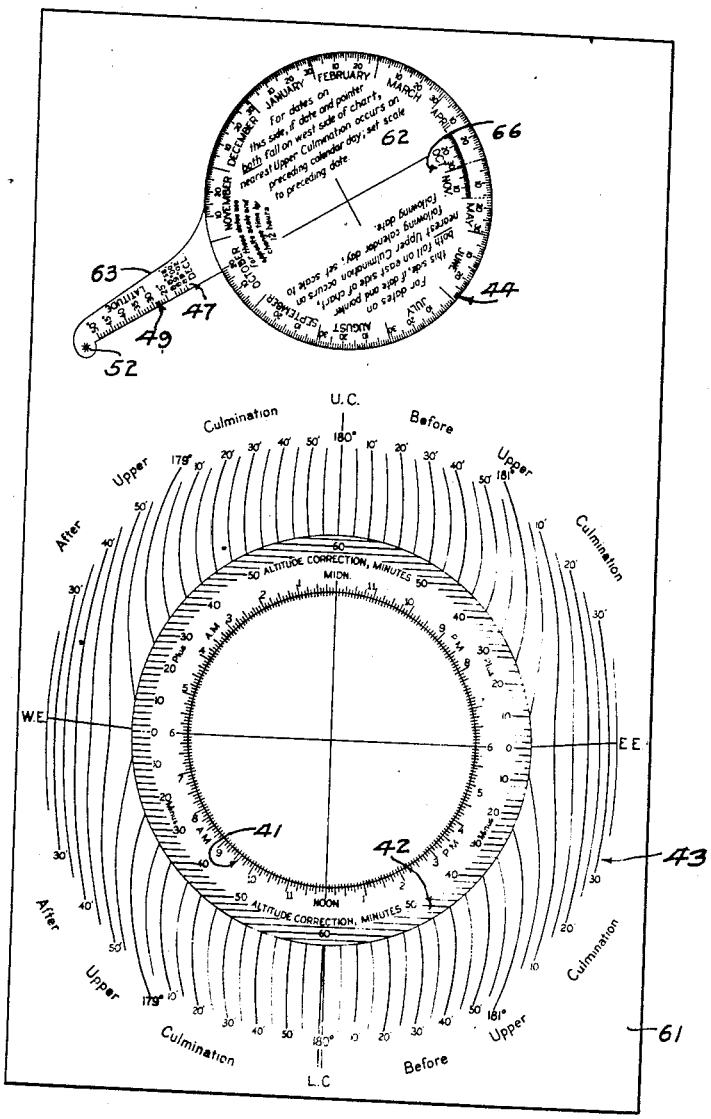
Fig. 10 is a plan view of an embodiment of this invention and illustrates a construction from which the device of Fig. 9 may be readily formed.

*Figures 9 and 10*

A further embodiment of this invention is shown in Fig. 9 and comprises a base 61, a disc 62 having an integral arm 63, and a pivotal connection 64. The base 61, the disc 62 and the arm 63 may be formed of any suitable material and may be conveniently and inexpensively formed in the manner illustrated by Fig. 10. Figure 10 illustrates a sheet of cardboard incorporating the base 61, the disc 62 and the arm 63. The disc 62 and the arm 63 may be removed by cutting along their boundaries and may then be pivotally mounted on the base 61 by any suitable means such as a pin, thumbtack, or rivet 64. Thus the device may be produced and distributed economically in large quantities by printing its parts on a single card.

The base 61 is provided with scale 41 and charts 42 and 43 corresponding to the similarly numbered scales and charts on the base 15 of Fig. 1.

The azimuth chart 43 of Figs. 9 and 10 has a 4-minute blank space 70 at lower culmination, whereas the azimuth lines in Fig. 1 are continuous at lower culmination. The 4-minute blank space 70 in the azimuth chart 43 of Figs. 9 and 10 is provided to permit the use of local mean time since this embodiment does not provide relative adjustment of the disc 62 and the arm 63 to allow for conversion to sidereal time.

The disc 62 is provided with a date scale 44 corresponding to the date scale 44 on the disc 16 of Fig. 1. Where the device is printed on a card or opaque medium, the arm 63 obliterates the underlying time marks of the scale 41. In this event, the date marks of the date scale 44 opposite the arm 63 would be located at the opposite side of the disc 62, as shown at 66 in Figs. 9 and 10, to be used with the proper time in the other half of the day. To allow for variations in longitude, the time setting on the device of Figs. 9 and 10 must be local mean time, and the user must convert his watch time to local mean time by the usual corrections for the longitude difference from the standard time meridian to which the watch is set. To eliminate the need for conversion from mean time to sidereal time, the azimuth lines are plotted on a mean time basis, thereby leaving a blank space of approximately 4 minutes at lower culmination. If the directions printed on the disc 62 are observed, the index edge of the pointer arm 63 will never fall within the blank space.

The arm 63 is provided with a declination scale 47 and a latitude scale 49 corresponding to the similarly numbered scales of Fig. 1. In the Fig. 9 embodiment, however, the declination scale 47 overlies the altitude correction chart 42. The arm 63 has a symbol 52 corresponding in position and function to the symbol 52 of Fig. 1.

The device of Fig. 9 requires and provides no relative adjustment of the arm 63 and the disc 62, and can be used very satisfactorily for determining the azimuth and altitude of Polaris within a few minutes of arc, which is sufficiently accurate for locating the star for a daylight observation. The scales 44 and 41 on the disc 62 and the base 61 are so constructed that when the arm 63 is at the midnight position, or upper culmination, the time of the clock circle or scale 41 corresponding to any date on the calendar circle or scale 44 is the time of upper culmination on that day, or one of the times in that day when Polaris is due north of the observer. As the disc 62 rotates counterclockwise, so that any particular date mark moves progressively around the clock circle 41, the symbol 52 on the pointer arm 63 actually follows the apparent path of Polaris around the North Pole for that particular day. Therefore, when the time and date of a particular observation are made coincident on the two circles (41 and 44), the angle at the center between the pointer arm 63 and the UC line represents the actual hour angle of Polaris at that instant. The remaining scales and charts are so constructed that, in that position, the azimuth of Polaris may be read on the azimuth chart 43 at the point of the latitude scale 49 on the pointer arm 63 corresponding to the latitude of the observation station, and the correction to be applied to the latitude of the station to obtain the altitude of Polaris at that instant may be read on the altitude correction chart 42 at the point on the declination scale 47 of the pointer arm 63 corresponding to the declination of Polaris at that time. The declination of Polaris changes very slowly and a single mean value may be obtained from the Ephemeris and used for this purpose for a full field season.

*Use and operation of Figure 9 embodiment*

The device of Fig. 9 is used in the same manner as the device of Fig. 1, except that no relative adjustment of the arm 63 and disc 62 is provided in the Fig. 9 embodiment.

As a specific example of the use of the second embodiment of this invention reference will be made to the setting as illustrated in Fig. 9. This figure shows the setting for the latitude 40°00′ N., longitude 79°00′ W. at 8:14 a. m. E. W. T. on May 23, 1943. To convert watch time to local mean time, one hour is subtracted from E. W. T. to obtain E. S. T., or the standard time on the 75th meridian, and a correction of 16 minutes (⁴⁄₁₅ of 60 minutes) is added to reduce this to the local mean time at the 79th meridian. The application of these two corrections yields 7:30 a. m. as the local mean time of the observation. The disc 62 is turned until the date, May 23, coincides with the time 7:30 a. m. The device is now set as shown in Fig. 9. At latitude 40° on the pointer arm, the azimuth of Polaris is read as 180°44′. The declination of Polaris on May 23, 1943 may be found in the Ephemeris to be 88°59′25″. At this value on the declination scale 47 of the pointer arm 63, the altitude correction may be read on the chart 42 as +50′. The altitude of Polaris is therefore 40°50′.

Both of the illustrated embodiments present advantages. The embodiment of Figs. 1 through 8 is particularly well suited for office use and exceptionally precise azimuth determinations, such as final computation of an azimuth observation. On the other hand, the device of Figs. 9 and 10 is relatively inexpensive, well adapted for field use, and may be provided for use of relatively short duration with reasonably accurate determinations.

The foregoing is to be understood as illustrative, since this invention includes all modifications and embodiments coming within the scope of the appended claims.

I claim:

1. A device for determining the position of a celestial body, said device comprising a base member having indicia constituting an azimuth chart, a member rotatably mounted on said base member, one of said members having indicia constituting a time scale, the other of said members having indicia constituting a date scale, and an arm movable with said rotatable member and having indicia constituting a latitude scale adapted to travel over said azimuth chart, whereby an observer by adjusting said rotatable member to provide a relative setting of said date and time scales according to the date and time of observation may determine the azimuth of the celestial body by taking a reading of the azimuth chart opposite the reading on the latitude scale corresponding to the latitude of his point of observation.

2. A device for determining the position of a celestial body, said device comprising a base, a disc rotatably mounted on said base, and an arm extending outwardly and radially from the periphery of said disc and movable therewith; said disc at the periphery thereof having indicia constituting a circular, clockwise-progressing date scale; said base adjacent the periphery of said disc having indicia constituting a circular, counterclockwise-progressing time scale; said base having indicia constituting an annular aximuth chart generally concentric to said time scale; said arm having indicia constituting a latitude scale adapted to travel the annular path defined by said azimuth chart as said disc and arm are rotated as a unit to set said date scale relative to said time scale corresponding to the date and time of an observation.

3. A device for determining the position of a celestial body, said device comprising a base member having indicia constituting an annular azimuth chart and an annular altitude correction chart, a member rotatably mounted on said base member, one of said members having indicia constituting a time scale, the other of said members having indicia constituting a date scale, and an arm movable with said rotatable member and having indicia constituting a declination scale and a longitudinally extending latitude scale, whereby an observer by adjusting said rotatable member to provide a relative setting of said date and time scales according to the date and time of observation may determine altitude correction by taking a reading of the altitude correction chart as indicated by said arm and according to the declination of the celestial body for the time of observation and may determine azimuth by taking a reading of the azimuth chart opposite the reading on the latitude scale corresponding to the latitude of his point of observation.

4. A device for determining the azimuth and altitude of a celestial body, said device comprising a base, a disc rotatably mounted on said base, an arm extending radially of said disc and movable therewith, said arm being adjustable rotatably and radially relative to said disc, and means for clamping said arm to said disc in adjusted relation; said base and disc having indicia constituting concentric, cooperating, circular time and date scales; said base having indicia constituting an outer annular azimuth chart and an inner annular altitude chart, said altitude chart being concentric with said date and time scales; said arm having indicia constituting a latitude scale and an altitude correction index mark adapted to travel annular paths defined by said azimuth and altitude charts respectively; said arm and disc having cooperating indicia constituting an index line and a longitude scale for use in rotatably adjusting and setting said arm relative to said disc to compensate for variations in longitude, date and time and for conversion from solar to sidereal time units; said arm and disc having additional cooperating indicia constituting an index line and a declination scale for use in radially adjusting said arm relative to said disc to allow for variations in the declination of said celestial body.

5. A device as defined in claim 4, wherein the clamping means is rotatably carried by a bearing of the base to provide the rotatable mounting of the disc by said base.

6. A device for determining the azimuth and altitude of a celestial body, said device comprising a base, a disc rotatably mounted on said base, and an arm carried by and extending radially of said disc and movable therewith; said disc and said base having indicia constituting cooperating concentric, circular date and time scales; said base having indicia constituting an annular, altitude correction chart concentric with said date and time scales; said base having indicia constituting an annular azimuth chart generally concentric with said altitude correction chart; said arm having indicia constituting a declination scale and a latitude scale adapted to travel annular paths defined by said altitude correction chart and said azimuth chart, respectively, as said disc and said arm are rotated as a unit to provide a setting of said date and time scales corresponding to the date and time of an observation, whereby an observer by rotatably adjusting said disc to provide a relative setting of said date and time scales according to the date and time of observation may determine the azimuth of the celestial body by taking a reading of the azimuth chart opposite the reading of the latitude scale corresponding to the latitude of his point of observation and also determine altitude correction for the celestial body by taking a reading of the altitude correction chart opposite the reading of the declination scale corresponding to the declination of the celestial body.

JULIUS L. SPEERT.